US006989104B2

(12) United States Patent
Reamsnyder et al.

(10) Patent No.: US 6,989,104 B2
(45) Date of Patent: Jan. 24, 2006

(54) FUEL FILTER WITH RESTRICTION INDICATOR, AND METHOD OF USING SAME

(75) Inventors: Christopher R. Reamsnyder, Perrysburg, OH (US); Darryl V. Logan, Toledo, OH (US)

(73) Assignee: Honeywell International, Inc., Morristown, NJ (US)

( * ) Notice: Subject to any disclaimer, the term of this patent is extended or adjusted under 35 U.S.C. 154(b) by 129 days.

(21) Appl. No.: 10/661,704

(22) Filed: Sep. 12, 2003

(65) Prior Publication Data

US 2005/0056595 A1 Mar. 17, 2005

(51) Int. Cl.
*C02F 1/00* (2006.01)

(52) U.S. Cl. .................. 210/741; 210/90; 210/438; 210/443

(58) Field of Classification Search .................. 210/85, 210/90, 741, 442, 443, 444, 438, 454; 55/DIG. 34; 96/421; 116/268, 271, 272, 270

See application file for complete search history.

(56) References Cited

U.S. PATENT DOCUMENTS

| | | | |
|---|---|---|---|
| 3,216,571 A * | 11/1965 | Whiting et al. ............... 210/90 |
| 4,654,140 A | 3/1987 | Chen |
| 4,818,385 A | 4/1989 | Medley, III |
| 4,981,584 A | 1/1991 | Nunes |
| 5,132,009 A | 7/1992 | Futa, Jr. et al. |
| 5,507,942 A | 4/1996 | Davis |
| 5,702,592 A | 12/1997 | Suri et al. |
| 5,766,449 A | 6/1998 | Davis |
| 5,776,332 A | 7/1998 | Hurner |
| 5,916,442 A | 6/1999 | Goodrich |
| 6,203,698 B1 | 3/2001 | Goodrich |
| 6,852,216 B2 * | 2/2005 | Moscaritolo et al. ......... 210/85 |

* cited by examiner

Primary Examiner—Robert A. Hopkins

(57) ABSTRACT

A fuel filter assembly for a combustion engine, including a two-part filter housing, a filter element, and a restriction sensor, including an external visual display apparatus for indicating when to replace the filter element. As fluid pressure increases within the filter housing, the visual display apparatus correspondingly displays the increase in pressure. When the pressure sensor detects an amount of pressure at or in excess of a predetermined amount, the visual display apparatus indicates replacement of the filter element. A modified embodiment including an electronic pressure sensor and a remote display unit is also described.

20 Claims, 4 Drawing Sheets

222

FUEL FILTER WITH RESTRICTION INDICATOR, AND METHOD OF USING SAME

BACKGROUND OF THE INVENTION

1. Field of the Invention

The present invention relates to a fuel filter apparatus for filtering contaminants from liquid fuel for combustion engines, including an indicator for displaying the condition of the filter media contained therein, and to methods of using the described apparatus. More particularly, the present invention relates to a fuel filter including a restriction indicator gauge with a visual display, for identifying when a fuel filter needs to be replaced, and to methods of using the described filter.

2. Description of the Background Art

The use of fluid filters to protect the downstream components of a machine is well known. Several different fluids associated with internal combustion engines require filtration, i.e. fuel and oil. In particular, fuel filters protect the engine from contaminants, such as dirt and water which, if left unfiltered, could result in inefficient combustion, reduced engine performance and premature engine wear. Fluid filters need to be replaced, at regular intervals, to ensure continued proper filtration.

Known fuel filters for combustion engines generally include a housing, filter, and connective conduits to provide an inlet and outlet. Known filters may also include an optional drain valve (typically a threaded plug, removable from the housing, to allow fuel or coalesced water drainage therefrom). Often, the housing is almost entirely transparent (or includes a sight glass) to permit an individual to view the condition of the fuel filter, and then determine whether replacement of the fuel filter is necessary. However, visually determining when to replace a filter, based upon this known method is subjective, given that filter replacement depends on the opinion and/or experience of the individual viewing the filter. Moreover, a plugged filter element does not always appear visually different from a clean one.

Accordingly, concerns arise on both sides as to when a fuel filter should be replaced; premature replacement of a fuel filter gives rise to cost, disposal, and environmental concerns, while delayed replacement of a fuel filter gives rise to concerns of diminished engine performance, reduced efficiency and premature wear. As a result, a number of methods and equipment for detecting deterioration and contamination of engine fuel have been developed.

Some examples of known fuel filters are illustrated in U.S. Pat. No. 4,981,584 issued to Nunes; U.S. Pat. No. 5,776,332 issued to Hurner; U.S. Pat. Nos. 5,507,942 and 5,766,449 issued to Davis, and; U.S. Pat. Nos. 5,916,442 and 6,203,698 issued to Goodrich.

The use of pressure sensors to monitor fluid pressure within fluid filters is taught by U.S. Pat. No. 4,654,140 to Chen, U.S. Pat. No. 4,818,385 to Medley, U.S. Pat. No. 5,132,009 to Futa, Jr. and U.S. Pat. No. 5,702,592 to Suri et al.

While the known devices have shown some utility for their intended purposes, a need still exists in the art for an apparatus that provides a simple, cost-effective, visual indication of the filter's condition, to reduce the subjectivity inherent in visually determining filter replacement, while still maintaining effective fuel filtration.

SUMMARY OF THE INVENTION

The present invention has been developed to overcome limitations and disadvantages of known fuel filters, and to generally fill a need in the art for a fuel filter which combines cost-effective and reliable fuel filtration with an accurate and objective visual condition indicator.

The present invention provides a method and apparatus for filtering liquid fuel for a combustion engine, in which the apparatus includes a restriction indicator gauge to visually indicate when the filter requires replacement. The fuel filter hereof can be serviced or changed by non-expert service personnel or by a vehicle owner, if desired, when the filter visually indicates the need for replacement.

In accordance with a particular embodiment hereof, the present invention provides a fuel filter assembly including a two-part filter housing, a filter element, and a restriction indicator gauge. The restriction indicator gauge includes a sensor that attaches to the housing, and includes a probe for insertion into the center of the filter element.

A filter element according to the invention may include a hydrophobic filter media, to remove fuel contaminants from fuel, and to reduce or eliminate microbial growth within the downstream components of a vehicle's fuel system.

Additionally, the fuel filter hereof may also contain one or more fuel additives, for slow release over time, to stabilize fuel quality, improve combustion, reduce emissions, clean fuel injectors, etc. Examples of some fuel additives which may be associated with the fuel filter hererof include antioxidants, cetane improvers, corrosion inhibitors, demulsifiers, dispersants, lubricating agents, metal detergents, and metal deactivators coated with a hydrocarbon-insoluble material.

The fuel filter according to the invention may include a restriction indicator gauge for fuel flow through in-situ analysis. In-situ analysis visually and beneficially indicates the actual level of restriction applied to fuel flowing to the engine. Such an in-situ fuel flow restriction indicating device is advantageous because the indicator may also be retrofitted on to a conventional fuel filter housing equipped with a drain plug. This capability permits vehicle owners of nearly all makes and models to reap the benefits of visual fuel restriction detection, which helps preserve the life of a vehicle's engine. This feature of the device also affords a cost-effective mechanism for sensing fuel restriction, as it requires no specifically designated mounting area and no separate maintenance. A worn system may be replaced with a new system as part of a new fuel filter installation, as required.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Overview—First Embodiment

Figure 1:
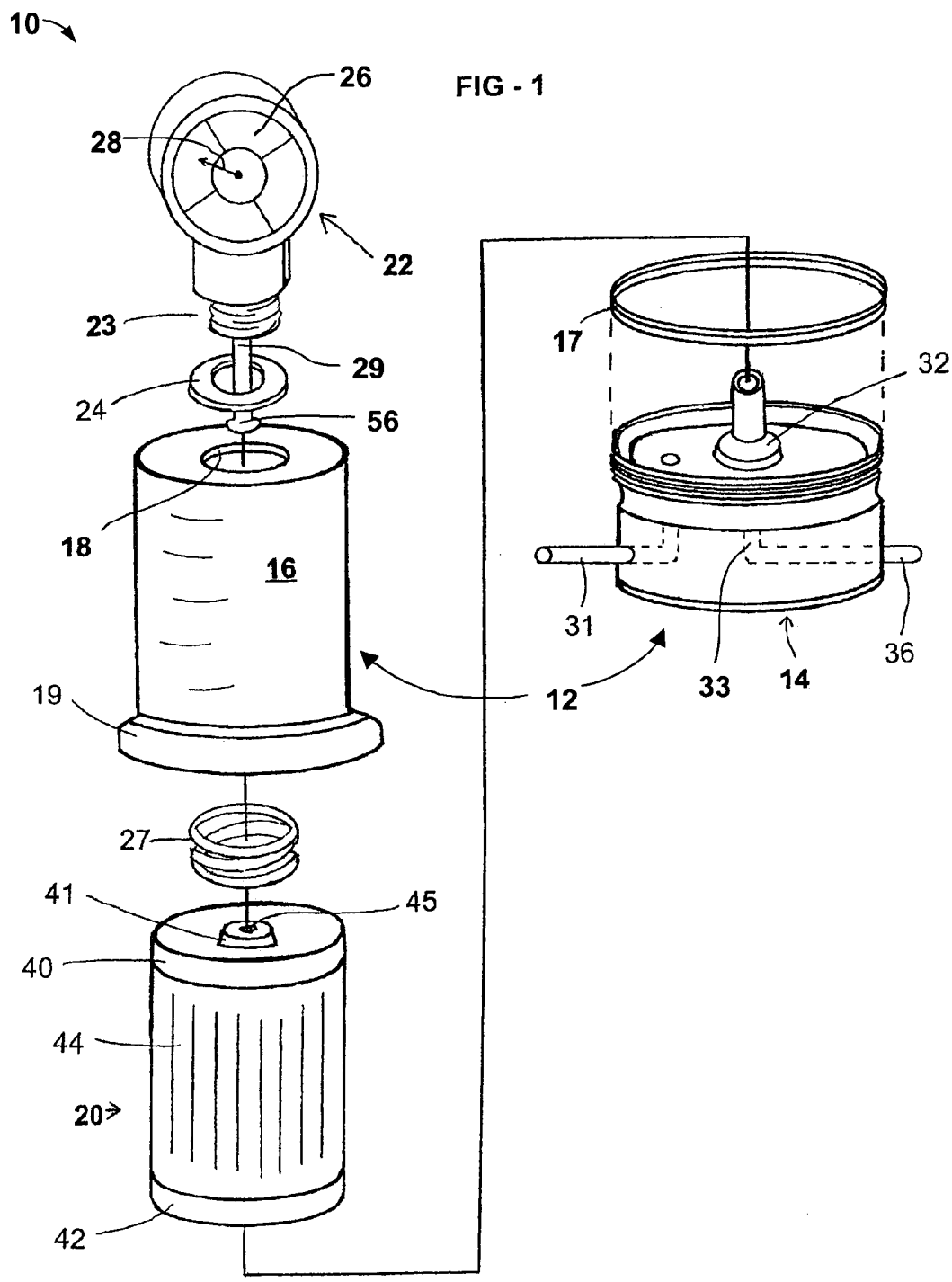
FIG. 1 is an exploded perspective view of a fuel filter assembly in accordance with a first embodiment of the invention.
Figure 2:
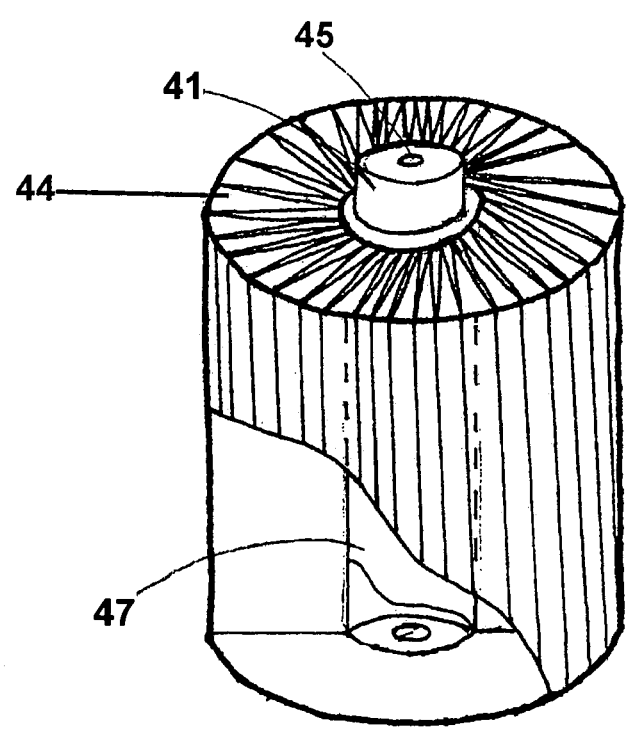
FIG. 2 is a partially exploded sectional view of the fuel filter assembly of FIG. 1.

Referring now to FIGS. 1–2, a fuel filter assembly and restriction indicating system, in accordance with the present invention, is shown generally at 10. The assembly 10 includes a two-part housing 12 (FIG. 2), a filter element 20 disposed within the housing, and a restriction indicator gauge 22, which fits into a threaded opening in the housing, as will be further described. Other secondary parts are also included, as will be further described herein.

The Filter Housing

The housing 12 includes a base 14 having a plurality of channels formed therein, and a housing cover 16, which fits threadably and rotatably on top of the base. A lower O-ring seal 17 is provided for sealing placement between the base 14 and the housing cover 16.

The housing cover 16 may be constructed from material similar to conventional, transparent fuel filter housings; however, since the housing cover need not be transparent, it may be constructed from any material suitable for contact with fuel, namely various types of fuel-tolerant plastic or metal.

The housing cover 16 includes an enlarged diameter skirt 19 at the bottom edge thereof, which is internally threaded to allow the housing cover to be threadably installed on the base 14.

The housing cover 16 also has a threaded cylindrical aperture 18 formed in a top center portion thereof, to receive a threaded base portion 23 of the restriction indicator gauge 22 therein. An upper o-ring seal 24 is provided to fit around the base portion 23 of the restriction indicator gauge, and to form a fluid-resistant seal between the restriction indicator gauge 22 and the top of the housing cover 16.

The top of the housing cover 16 also includes an integral dependent boss 25 extending downwardly thereon, as shown. A tension spring 27 is located between the housing cover 16 and the filter element 20, surrounding the dependent boss 25. The spring 27 acts to put constant downward pressure on the filter element 20, thereby forming a seal between the filter element and the housing base 14. More specifically, the seal is formed between a lower end cap 42 on the filter element 20, and a central boss 32 of the housing base.

The housing base 14 has an inlet passage 30 formed therein (FIG. 2), which feeds fuel into the housing 12, to an area outside of the filter element 20. The housing base 14 may have a hollow inlet tube 31 extending outwardly from the inlet passage 30, as shown.

The housing base 14 also has a raised central boss 32 with an outlet feed tube 33 located centrally thereon. As seen in FIG. 2, the filter element 20 rests on the central boss 32 of the housing base 14, leaving the outer portion of the filter element elevated above the floor of the base, and allowing fuel to flow therearound as it leaves the inlet passage 30.

The housing base 14 further has an outlet passage 34 formed therein, in fluid communication with the centrally located outlet feed tube 33. The housing base 14 may also have a hollow outlet tube 36 extending outwardly from the outlet passage 34, as shown.

In this manner, the unfiltered fuel travels through the inlet tube 31 of the housing base 14, into a chamber 35 between the housing cover 16 and the filter element 20, through the filter element 20 and into the internal cavity 47 thereof, ultimately exiting through the outlet tube 36 of the housing base.

The Filter Element

The filter element 20 has resilient upper and lower end caps 40, 42 respectively, thereon. The end caps 40, 42 are formed from a ble, fuel-tolerant material, which may be steel, plastic or a suitable elastomer. The upper end cap 40 includes a hollow central collar 41 having a central opening 45 formed vertically therethrough to receive a probe 29 of the restriction indicator 22.

The central portion of the filter element 20 contains the filter media, which is in the general shape of a hollow cylinder defining a hollow internal cavity 47 therein. The filter media may be formed from pleated filter paper, porous sintered metal or plastic, or other suitable filter material.

The filter media 44 may be formed from a paper material which has been coated with a hydrophobic substance, to resist decomposition when in contact with fuel. Depending on the filtration material, a retaining cage surrounding may be used around the filter media 44 for added support, if desired. Additionally, the filter media 44 may also be coated with, or the filter 10 may otherwise include a detergent or other fuel additive, provided for time release, to consistently disperse the additive or detergent throughout the life of the filter.

Although the fuel filter media 44 is shown in an accordion configuration, alternative configurations may be implemented; by way of example, such alternative configurations may include a honeycomb configuration, or another alternative configuration.

The Restriction Indicator Gauge

The restriction indicator gauge 22 may be described as one type of restriction sensor.

In the embodiment of FIGS. 1–2, the restriction indicator gauge 22 includes the threaded base section 23, a display face 26, and an indicator needle 28, which is movably mounted on the display face. The restriction indicator gauge 22 further includes a restriction-monitoring probe 29 having a first pressure sensor 56 at the lower tip end thereof. A second pressure sensor may be located inside the threaded base section 23 of the gauge 22.

Alternatively, the gauge 22 may include a sealed internal fluid coil, which uses fluid pressure from outside of the filter element 20 to move the needle 28.

The gauge 22 preferably senses the level of restriction as a pressure differential between fluid pressure outside and inside of the filter element 20. As the level of restriction increases, the increase is reflected by movement of the needle 28 on the display face 26. When the level of restriction exceeds a predetermined limit, such as twelve inches of mercury, the indicator display illustrates the need to replace the filter element 20, by moving the needle 28 into the area marked "Change", which may be color-coded in red or another suitable color.

The embodiment of the invention shown in FIGS. 1–2 utilizes a three-field condition range to indicate the condition of the fuel filter. However, alternative embodiments indicating the need to replace the fuel filter may include a color changing display or an increasing numeric scale. Additionally, the display indicator may include an audible indicator as well.

Figure 4:
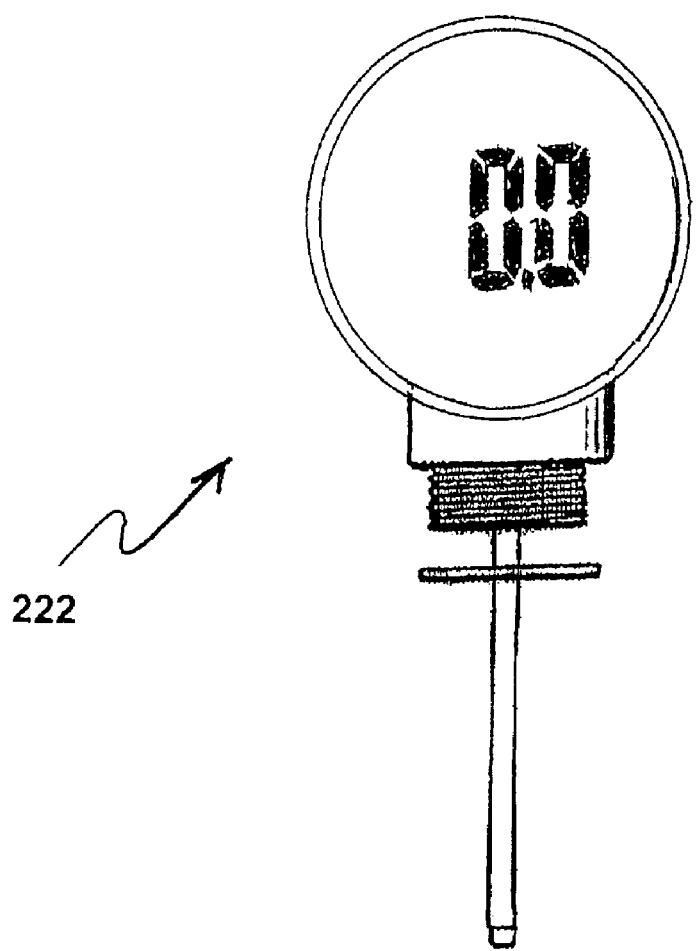
FIG. 4 is a front plan view of a digital gauge which is usable in the apparatus of FIGS. 1–2.

While a first embodiment of the present invention is illustrated in FIGS. 1 and 2, alternative embodiments are conceivable. While the gauge 22 shown in FIGS. 1–2 is an analog gauge with a dial indicator, it will be understood that in an alternative embodiment, as shown in FIG. 4, the gauge used could be a digital gauge 222 with an electronic readout. The gauge 222 of FIG. 4 could be substituted in place of the analog gauge 22 in the apparatus of FIGS. 1–2.

By way of example, the collar 41 is shown integrally secured to the fuel filter; however, the collar may be secured to the fuel filter housing, or may be independent of both the filter and the housing. Further, the restriction indicator probe 29 may be replaced with a hollow tube through which filtered fuel travels to a restriction indicator gauge external from the filter housing 12. In another modified version of the first embodiment, the restriction indicator gauge may be completely contained within the filter housing, with a transparent housing cover 16.

Second Embodiment

Figure 3:
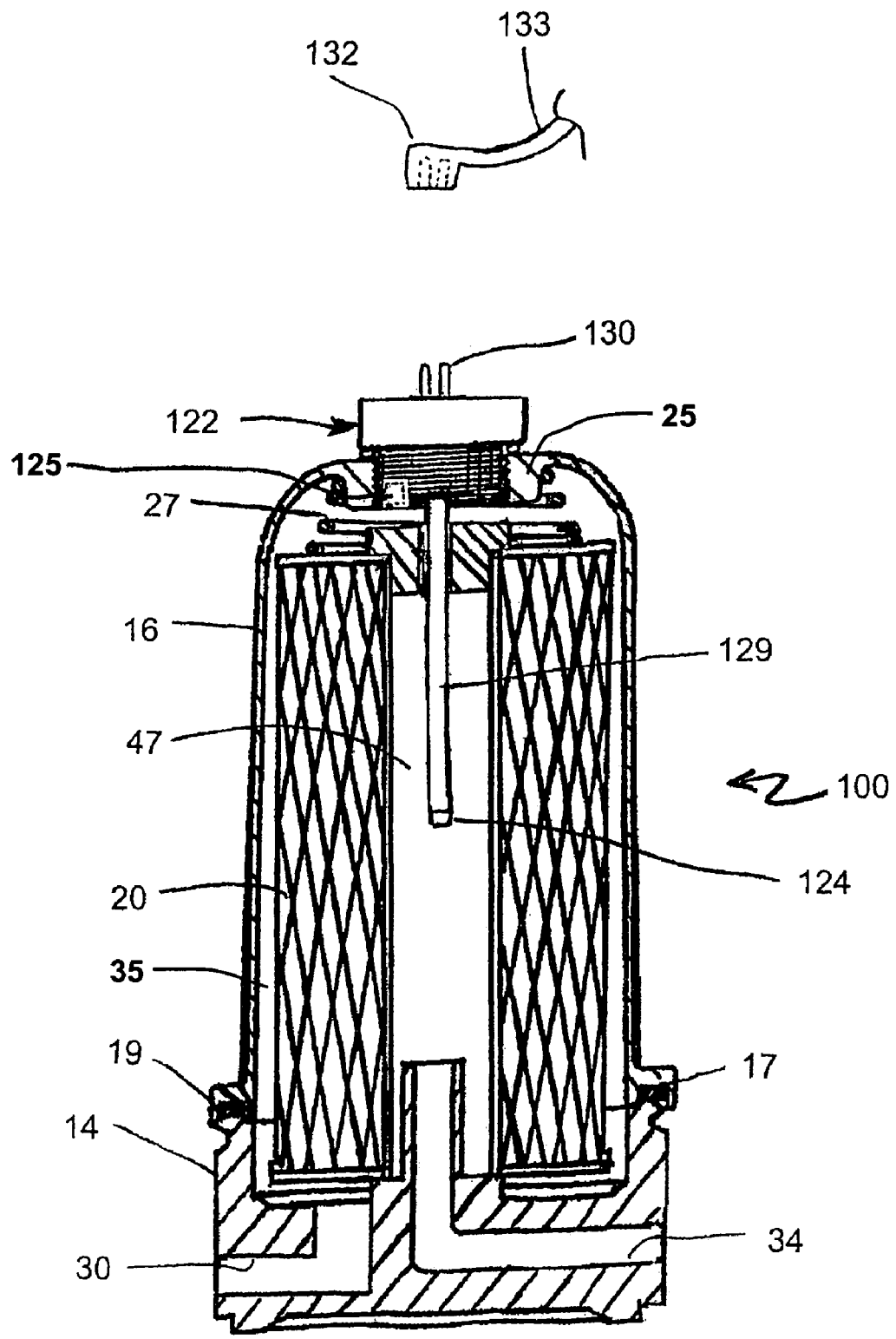
FIG. 3 is partially exploded sectional view of a modified fuel filter assembly in accordance with a second embodiment of the invention.

Referring now to FIG. 3, a modified fuel filter assembly according to a second embodiment of the invention is shown generally at 100. The filter assembly 100 according to this embodiment shares many features with the first embodiment. Unless specifically described as different herein, it will be understood that the filter assembly 100 is similar to the filter assembly 10 as previously described.

The filter assembly 100 according to the second embodiment includes a restriction sensor 122 in place of the gauge 22 used in the first embodiment. The sensor 122 includes electrical contacts 130 for connecting to a plug connector 132, to send a signal to a remote location.

If desired, the plug connector may place the sensor 122 into communication with the main vehicle computer, such as the powertrain control module or the like.

Preferably, the signal from the sensor 122 is sent as a digital signal, and the wire(s) 133 going to the connector 132 either carry no current, or else do not carry current in an amount sufficient to create a spark. Current-carrying wires are avoided in this context, in order to reduce or eliminate any likelihood of a stray spark igniting fuel and starting a fire.

In the embodiment of FIG. 3, the sensor 122 includes both an external pressure sensor 124 and an internal pressure sensor 125, so that the pressure differential (restriction) can be displayed on a remote gauge, warning light or other display. Preferably, such a remote gauge or display will be provided inside of a vehicle, such as on the dashboard.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A fuel filter assembly, comprising:
a housing comprising a base and a housing cover, said housing having an inlet and an outlet;
a filter element disposed within said housing, said filter element having a raised collar with an opening formed therethrough; and
a restriction sensor, comprising: a probe for insertion into the raised collar.

2. The filter assembly of claim 1, wherein said restriction sensor comprises a display face and a moveable needle operatively attached to said display face for displaying output from said sensor.

3. The filter assembly of claim 1, wherein said housing cover has a threaded opening formed therein, and said restriction sensor comprises a threaded base portion which fits inside of said threaded opening in said housing.

4. The filter assembly of claim 3, wherein said restriction sensor comprises an electronic pressure sensor.

5. The filter assembly of claim 4, wherein said restriction sensor comprises a first pressure sensor for sensing fluid pressure outside the filter element, and a second pressure sensor for sensing pressure inside the filter element.

6. A fuel filter assembly comprising:
a) a housing comprising
a base having an inlet and an outlet, and
a housing cover which is removable attachable to said base, said housing cover having a threaded opening formed therein;
b) a filter element disposed within said housing, said filter element comprising filter media and first and second end caps attached to opposite ends of said filter media, said end caps being formed from a flexible elastomeric material each of said end caps having a respective opening formed centrally therethrough, one of said end caps having a raised collar surrounding said opening; and
c) a restriction sensor, comprising
a probe for insertion into the filter element through said collar; and
a threaded base portion which fits inside of said threaded opening of said housing cover.

7. The filter assembly of claim 6, wherein said restriction sensor comprises a display face and a movable needle operatively attached to said display face for displaying output from said sensor.

8. The filter assembly of claim 7, wherein said housing cover has a threaded opening formed therein, and said restriction sensor comprises a threaded base portion which fits inside of said threaded opening.

9. The filter assembly of claim 8, wherein said restriction sensor comprises an electronic pressure sensor.

10. The filter assembly of claim 9, wherein said restriction sensor comprises a first sensor for sensing fluid pressure outside the filter element, and a second sensor for sensing pressure inside the filter element.

11. A method of monitoring restriction in a fuel filter, comprising:
sensing fluid pressure inside of a fuel filter element;
sensing fluid pressure outside of the fuel filter element and comparing it to the fluid pressure inside the fuel filter element to determine a pressure differential; and
displaying a visual warning when the pressure differential exceeds a predetermined limit;
wherein the filter element has an end cap with a raised collar having an opening formed therethrough, and wherein the fluid pressure inside the filter element is sensed by a probe which has been inserted through the opening of the raised collar.

12. The method of claim 11, wherein said visual warning is displayed on the face of a gauge.

13. The method of claim 11, wherein said visual warning is displayed by activating a warning signal within a vehicle.

14. A fuel filter assembly, comprising:
a base portion having an inlet and an outlet;
a filter element comprising: filter media having an exterior surface and an interior surface, the interior surface defining a central cavity; a first end cap disposed on one end of the filter media; and a second end cap disposed on another end of the filter media, the first end cap having an opening providing access to the central cavity and the second end cap having an opening providing access to the central cavity, the opening of the second end cap being fluidly sealed about the outlet and the inlet being in fluid communication with the exterior surface;

a housing being removably secured to the base portion; and a restriction sensor, comprising: a probe for insertion into the filter element through the first end cap, the probe providing an output indicative of a restriction of the fuel filter assembly, and a gauge operatively connected to the probe and disposed outside of the housing, the gauge being configured to provide a visual indication of the output of the probe, wherein the first end cap further comprises a raised collar disposed about the opening of the first end cap and the probe passes through an opening in the raised collar.

15. The fuel filter assembly as in claim 14, wherein the base portion further comprises a threaded portion configured to engage a threaded opening of the housing.

16. The fuel filter assembly as in claim 14, wherein the first end cap and the second end cap are each formed from a flexible elastomeric material.

17. The fuel filter assembly as in claim 14, wherein the restriction sensor further comprises a threaded portion for threadingly engaging an opening in the housing.

18. The filter assembly of claim 14, wherein the restriction sensor comprises an electronic pressure sensor.

19. The filter assembly of claim 14, wherein the restriction sensor comprises a first pressure sensor for sensing fluid pressure outside the filter element, and a second pressure sensor for sensing fluid pressure inside the filter element.

20. The filter assembly of claim 19, wherein the restriction sensor is configured to continually display the pressure differential and the first pressure sensor and the second pressure sensor are electronic pressure sensors that provide an output indicative of a restriction level of the filter assembly, wherein the output varies as the restriction level varies.

* * * * *